United States Patent
Saito

(10) Patent No.: US 7,396,222 B2
(45) Date of Patent: Jul. 8, 2008

(54) INSERT MOLDING DIE AND METHOD FOR MOLDING HOLLOW COMPONENT

(75) Inventor: Kazuhiro Saito, Saitama (JP)

(73) Assignee: Calsonic Kansei Corporation (JP)

( * ) Notice: Subject to any disclaimer, the term of this patent is extended or adjusted under 35 U.S.C. 154(b) by 693 days.

(21) Appl. No.: 10/797,641

(22) Filed: Mar. 10, 2004

(65) Prior Publication Data
US 2004/0227272 A1 Nov. 18, 2004

(30) Foreign Application Priority Data
Mar. 10, 2003 (JP) .......................... P 2003-063767

(51) Int. Cl.
*B29C 45/14* (2006.01)

(52) U.S. Cl. .................... 425/116; 425/121; 425/129.1; 264/278

(58) Field of Classification Search ........................ None
See application file for complete search history.

(56) References Cited

U.S. PATENT DOCUMENTS 6,503,436 B1 * 1/2003 Koguchi et al. ............. 264/277

FOREIGN PATENT DOCUMENTS

| EP | 0 472 199 A1 | 2/1992 |
|---|---|---|
| JP | 53-96061 | 8/1978 |
| JP | 61-234536 | 10/1986 |
| JP | 1-275024 | 11/1989 |
| JP | 04-189528 | 7/1992 |
| JP | 5-84770 | 4/1993 |
| JP | 10-006348 | 1/1998 |
| JP | 10-6348 | 1/1998 |
| JP | 10-86180 | 4/1998 |
| JP | 10-175231 | 6/1998 |
| JP | 10-258442 | 9/1998 |
| JP | 11-333882 | 12/1999 |

* cited by examiner

*Primary Examiner*—Edmund H. Lee
(74) *Attorney, Agent, or Firm*—Kilpatrick Stockton LLP

(57) ABSTRACT

A molding die includes an upper die, upper-die pins arranged in the upper die to be movable up and down, springs arranged in the upper die to urge the upper-die pins downwardly, a lower die, lower-die pins arranged in the lower die to be movable up and down and springs arranged in the die to urge the pins upwardly. In molding, a hollow primary molded piece is accommodated in a cavity defined by the upper die and the lower die. Then, the piece is mounted on the pins with retained apart from a concave bottom surface of the lower die. Before closing the molding die, it is started to inject molten resin into the cavity. As a result, the molten resin enters a space between the primary molded piece and the concave bottom surface of the lower die. Even after completing to close the molding die, the injection of the molten resin is continued.

4 Claims, 14 Drawing Sheets

INSERT MOLDING DIE AND METHOD FOR MOLDING HOLLOW COMPONENT

BACKGROUND OF THE INVENTION

1. Field of the Invention

The present invention relates to an insert molding die for molding a hollow component and an insert molding method thereof.

2. Description of the Related Art

Conventionally, when producing such a hollow component by insert molding using molten resin, it is first performed to open a molding die having an upper die and a lower die and successively, a primary molded piece is accommodated in the lower die. Here noted, this primary molded piece is an element to form a hollow part in the hollow component. After positioning the primary molded piece in the lower die, the upper and lower dies are closed to complete the molding die. In this state, it is started to inject molten resin into a cavity defined in the molding die. In this way, the cavity is filled up with molten resin (Japanese Patent Application Laid-open No. 10-6348).

In the above-mentioned molding method, however, if the primary molded piece is also a hollow element, there is a possibility that to fill the cavity with molten resin while closing the molding die completely allows the primary molded piece to be subjected to excessive injection pressure thereby causing the primary molded piece to be deflected or collapsed. Additionally, the arrangement of the primary molded piece on the concave bottom surface of the lower die may cause a problem of short shot since the underside of the primary molded piece is not supplied with molten resin.

SUMMARY OF THE INVENTION

In the above-mentioned situations, it is an object of the present invention to provide an insert molding die that does not cause a primary molded piece to be deflected or collapsed in an insert molding process and also provide an insert molding method using such an insert molding die.

In order to attain the above object, according to the first aspect of the invention, there is provided an insert molding die for a hollow component, comprising: an upper die; a lower die arranged under the upper die, wherein the upper die and the lower die forms a cavity which accommodates the hollow component and is charged with molten resin; a plurality of upper-die pin members disposed on the upper die movably up and down; upper-die urging means disposed on the upper die to urge the upper-die pin members downwardly so that the upper-die pin members project from the upper die by opening the upper die and the lower die and the upper-die pin members pressed into the upper die by closing the upper die and the lower die; a plurality of lower-die pin members disposed on the lower die movably up and down so as to oppose the upper-die pin members respectively; and lower-die urging means disposed on the lower die to urge the lower-die pin members upwardly so that the lower-die pin members project from the lower die by opening the upper die and the lower die and the lower-die pin members pressed into the lower die by closing the upper die and the lower die.

With the above-mentioned constitution, it is possible to allow molten resin to go around a primary molded piece for forming a hollow part of the hollow component, especially, the underside of the primary molded piece thereby accomplishing the insert molding using the primary molded piece effectively. That is, before molding, the primary molded piece is mounted on the lower-die pin members while the piece is set apart from the bottom of the lower die. Under such a situation, if molten resin is injected into the cavity in the molding die while closing it by making the upper die approach the lower die, then the injected molten resin goes around the underside of the primary molded piece sufficiently. Therefore, it is possible to inject a predetermined amount of molten resin before completely closing the molding die, whereby the deflection and collapse of the primary molded piece caused by an injection pressure can be avoided during injection molding. Additionally, it is possible to prevent an occurrence of molding defects, for example, "short shot" where the molten resin is solidified disadvantageously despite that it has not pervaded the whole cavity in the molding die yet.

In a preferred embodiment, the upper-die urging means and the lower-die urging means comprise springs respectively.

Then, owing to the adoption of the springs as the upper-die urging means and the lower-die urging means, it is possible to provide the molding die with simple and inexpensive urging structures.

Alternatively, the upper-die urging means and the lower-die urging means may comprise pneumatic cylinders respectively.

In addition to the above effects (i.e. the provision of simple and inexpensive urging structures), then, it is also possible to adjust respective urging forces of the upper-die urging means and the lower-die urging means.

The upper-die urging means and the lower-die urging means may comprise hydraulic cylinders respectively.

Also in this case, it is expected to provide the molding die with simple and inexpensive urging structures. Furthermore, it is possible to accomplish a fine adjustment of the urging forces of the upper-die urging means and the lower-die urging means easily and certainly.

The upper die may be provided with injection means communicated with the cavity defined in the insert molding die to inject molten resin.

In this case, owing to the provision of the injection means in the upper die, the molten resin injected from the lower die can go around the primary molded piece due to gravitation, smoothly.

The lower die may be provided with another injection means communicated with the cavity defined in the insert molding die to inject molten resin.

In this case, owing to double provision of the injection means, it is possible to directly supply not only a cavity (part) in the upper die but another cavity (part) in the lower die with molten resin. Especially, owing to the possibility of injecting the molten resin into the cavity (part) in the lower die, it is possible to suppress an occurrence of deflection and collapse about the primary molded piece and also the defect of "short shot".

According to the second aspect of the invention, there is provided an insert molding method for molding a hollow component, comprising the steps of: preparing a molding die comprising an upper die and a lower die, at least either one of the upper die and the lower die being movable to and from the other die; separating the upper die from the lower die thereby opening the molding die; arranging a hollow primary molded piece in the lower die while retaining the hollow primary molded piece apart from a concave bottom surface of the lower die; starting to inject molten resin into the molding die while retaining the hollow primary molded piece apart from the concave bottom surface of the lower die thereby filling up a space between the hollow primary molded piece and the concave bottom surface with the molten resin before completely closing the molding die; and continuing to inject the molten resin into the molding die even after closing the molding die.

According to the above method of the invention, since the injection of molten resin is started in a condition to retain the primary molded piece apart from the concave bottom surface of the lower die before completely closing the molding die, an injection pressure exerted to the primary molded piece is reduced in comparison with a case of starting the injection after closing the molding die completely, whereby it is possible to prevent an occurrence of deflection and collapse about the primary molded piece and also the defect of "short shot".

In a preferred embodiment, the method may further comprise: preparing upper-die pin members disposed on the upper die movably up and down, upper-die urging means disposed on the upper die to urge the upper-die pin members downwardly, lower-die pin members disposed on the lower die movably up and down so as to oppose the upper-die pin members respectively, and lower-die urging means disposed on the lower die to urge the lower-die pin members upwardly, and setting the hollow primary molded piece on the lower-die pin members when arranging the hollow primary molded piece in the lower die.

The molten resin may be injected from the upper die in injecting the molten resin into the molding die.

In this case, owing to the provision of the injection means in the upper die, the molten resin injected from the lower die can go around the primary molded piece due to gravitation, smoothly.

The molten resin may be further injected from the lower die in injecting the molten resin into the molding die.

In this case, owing to double provision of the injection means, it is possible to directly supply not only a cavity (part) in the upper die but another cavity (part) in the lower die with molten resin. Especially, owing to the possibility of injecting the molten resin into the cavity (part) in the lower die, it is possible to suppress an occurrence of deflection and collapse about the primary molded piece and also the defect of "short shot".

These and other objects and features of the present invention will become more fully apparent from the following description and appended claims taken in conjunction with the accompany drawings.

DETAILED DESCRIPTION OF THE PREFERRED EMBODIMENT

Referring to accompanying drawings, an embodiment of the present invention will be described below.

Figure 1:
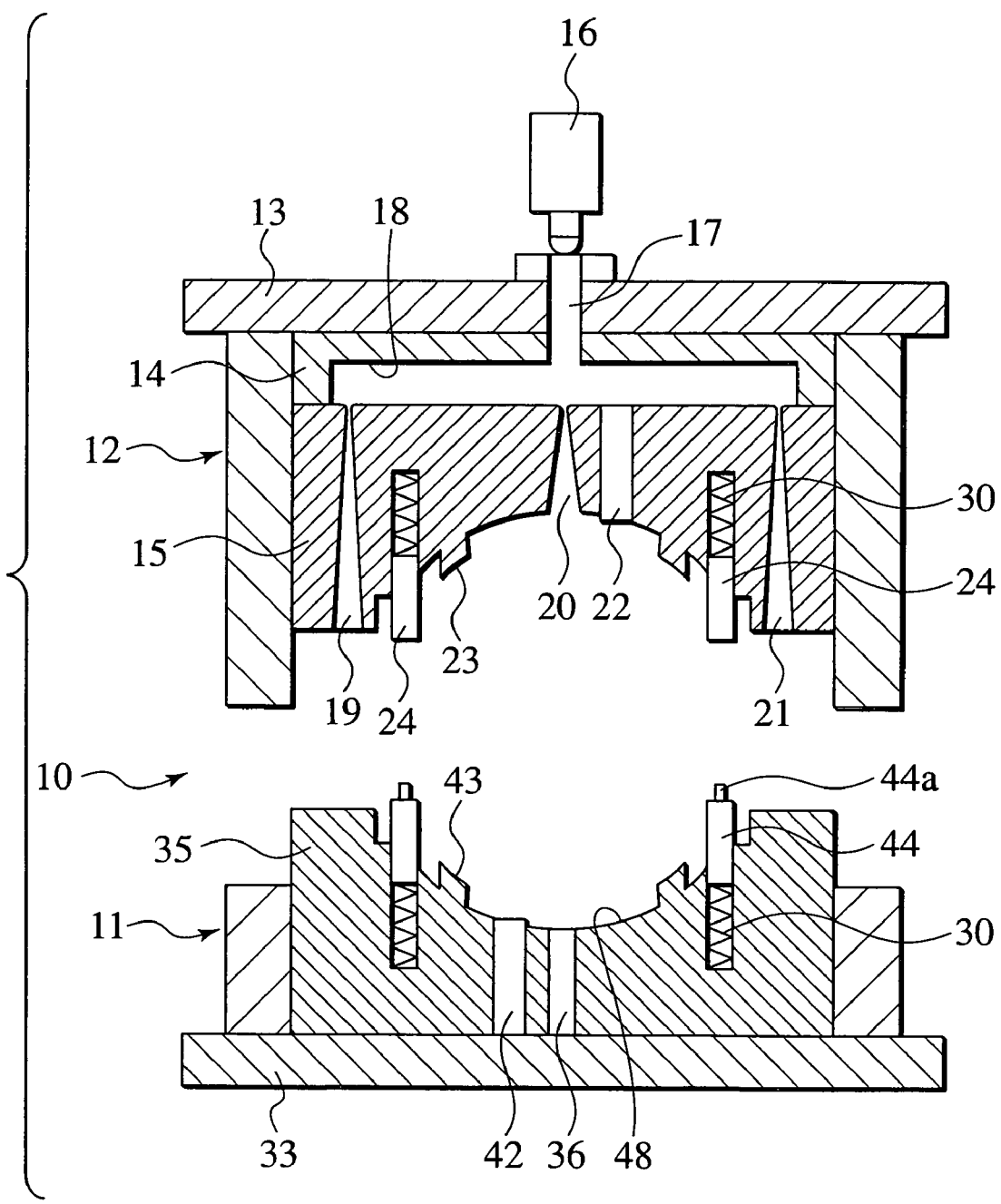
FIG. 1 is a sectional view of an insert molding die in accordance with an embodiment of the present invention.
Figure 2:
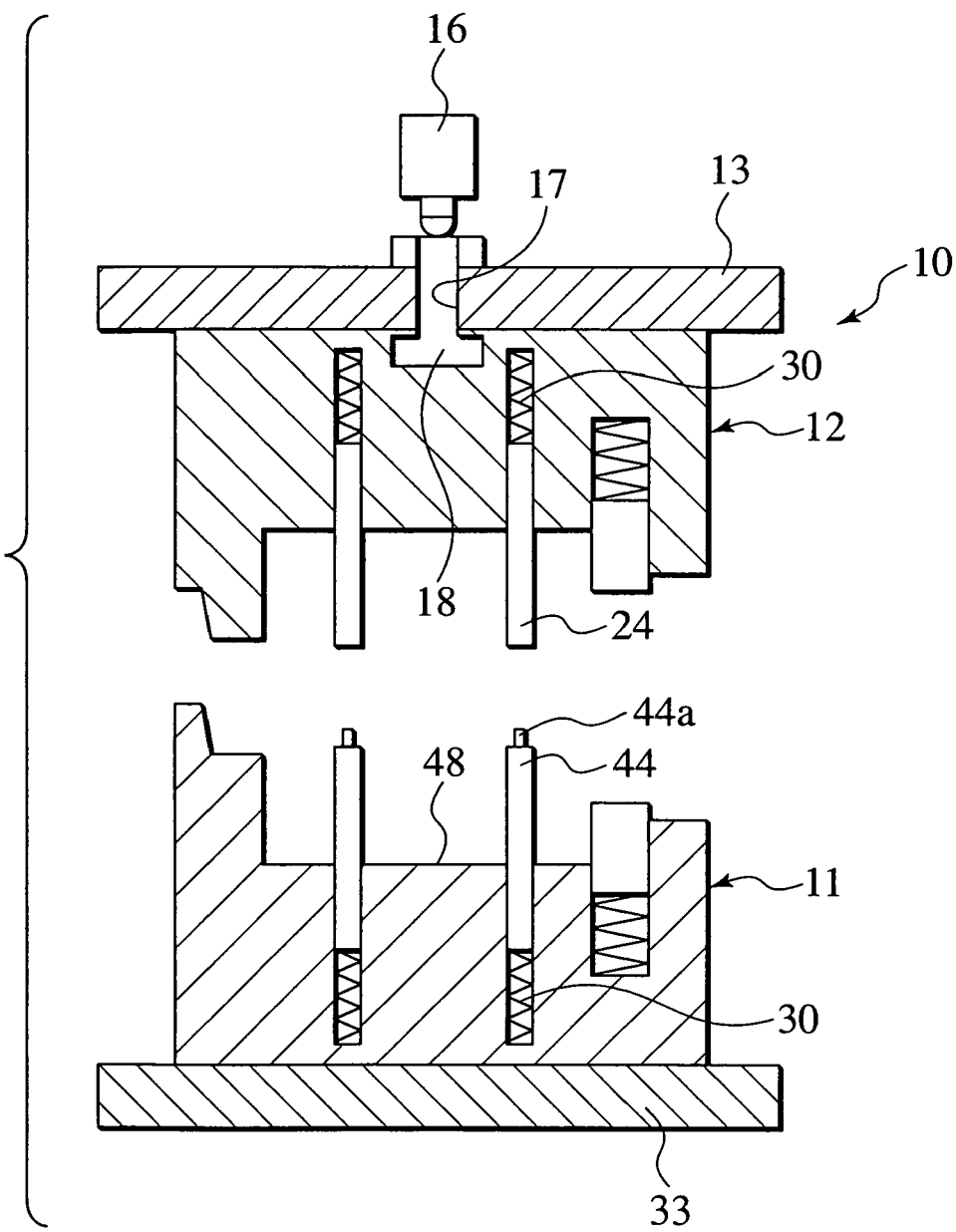
FIG. 2 is another sectional view of the insert molding die of the embodiment of the invention, taken in a direction perpendicular to the sectional direction of FIG. 1.

FIGS. 1 and 2 are sectional views showing an insert molding die (assembly) 10 in accordance with the embodiment of the invention. The insert molding die 10 includes a lower die 11 and an upper die 12 to be mated with each other. In these figures, the lower die 11 is provided in the form of an immovable die, while the upper die 12 is provided in the form of a movable die. These figures illustrate the molding die 10 in its opened state because the upper die 12 is being lifted up.

In the upper die 12, a die (body) 15 is fixed on a holder plate 13 through an attachment plate 14. An injection cylinder 13 is provided on the top of the holder plate 13.

In the holder plate 13 and the attachment plate 14, a through hole 17 is formed so as to penetrate them in their plate-thickness (vertical) direction, communicating with a hot runner 18 formed in the attachment plate 14. The die 15 is provided, on both (left and right) sides thereof in the width direction and also at the center, with three injection gates 19, 20 and 21. The above through hole 17, the hot runner 18 and the gates 19, 20, 21 are communicated with each other. As the injection cylinder 16 is positioned above the through hole 17 of the holder plate 13, this molding die 10 is constructed so that molten resin (not shown) injected from the injection cylinder 16 flows through the through hole 17 and the hot runner 18 and successively fills up a cavity defined in the molding die 10. In the vicinity of the center gate 20, a pressure sensor 22 is embedded in the die 15 to detect a molding pressure of the molten resin filling up the cavity in the molding die 10. Corresponding to the shape of a product to be molded, the lower part of the die 15 is formed to be concave and has projections 23 for abutment on a primary molded piece. When closing the molding die 10, the projections 23 abut to the primary molded piece 45 to support and retain the primary molded piece 45 on the proper position during injecting molten resin into the molding die 10.

Figure 3:
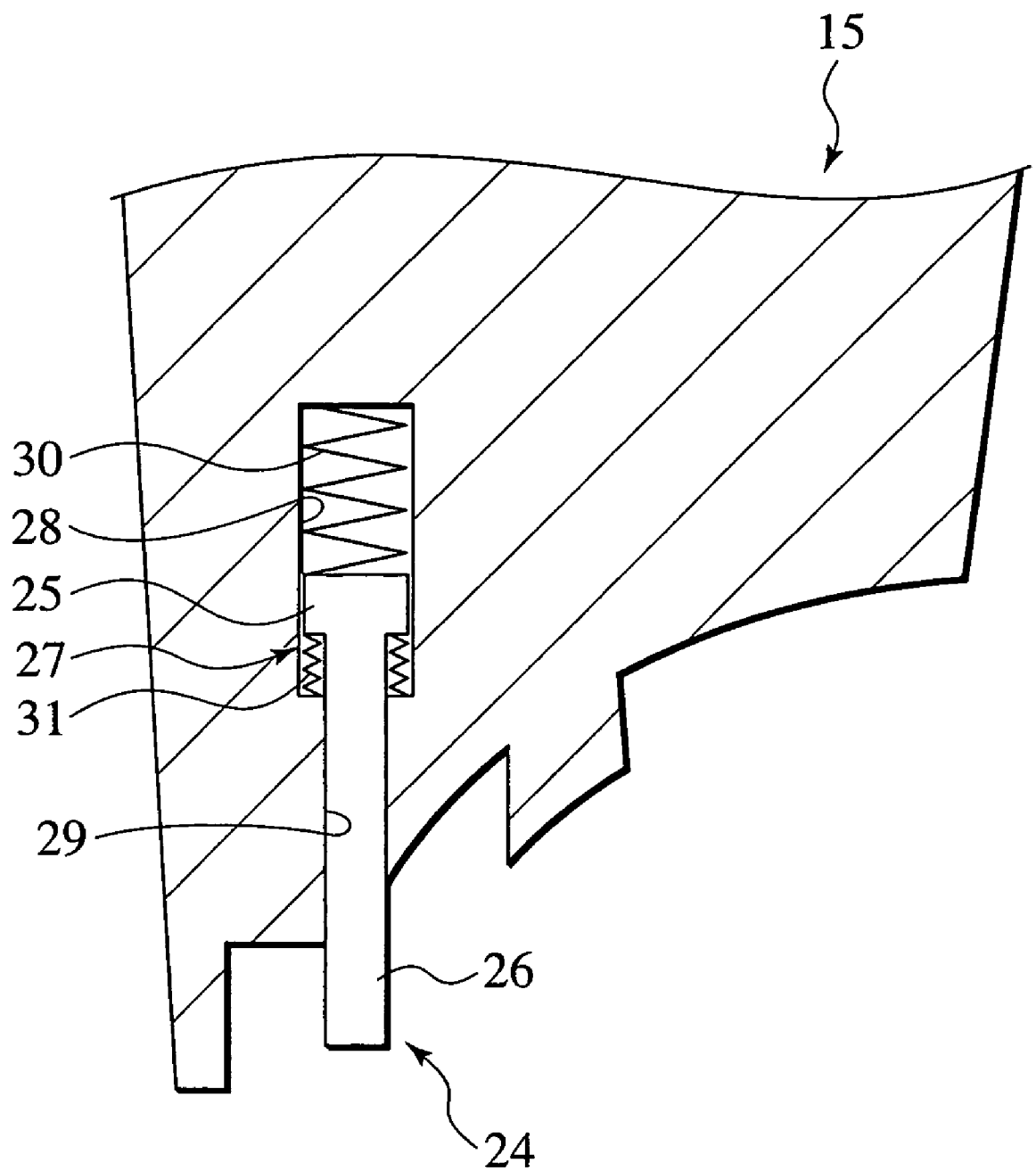
FIG. 3 is an enlarged sectional view showing the vicinity of an upper die pin.

In the vicinity of the gates 19, 20 on both sides of the die 15, there are provided, as the upper-die pin members of the invention, a plurality of upper-die pins 24 that project from the lower surface of the upper die 15 downwardly. These pins 24 are fitted to the die 15 so as to be movable up and down. As shown in FIG. 3, each of the upper-die pins 24 is provided, on the top end, with a brim part 25 of larger diameter. While, a body part 26 of smaller diameter is formed to extend from the brim part 25 downwardly. On the other hand, the die 15 is provided with a retainer hole 27 corresponding to the shape of the upper-die pin 24. In detail, the retainer hole 27 has a large diametrical part 28 on the upside and a small diametrical part 29 on the downside. In arrangement, the brim part 25 of the pin 24 is accommodated in the large diametrical part 28, while the body part 26 is accommodated in the small diametrical part 29. In the large diametrical part 28, additionally, an urged spring 30 (as the upper-die urging means of the invention) is arranged above the brim part 25, while another urged spring 31 is arranged below the brim part 25. In these springs, the upper spring 30 is adapted so as to press the upper-die pin 24 downwardly, while the lower spring 31 is adapted so as to lift up the pin 24. However, since an urging force about the upper spring 30 is set larger than that about the lower spring 31, the upper-die pin 24 is depressed downwardly in a normal state.

On the other hand, in the lower die 11, a die 35 is attached to a lower holder plate 33, as shown in FIG. 1. Similar to the upper die 12, the die 35 is also provided with projections 43, a pressure sensor 42 and a plurality of lower-die pins 44 as the lower-die pin members of the invention. When closing the molding die 10, the projections 43 abut to the primary molded piece 45 to support and retain the primary molded piece 45 on the proper position during injecting molten resin into the molding die 10. In the molding die 10, the lower-die pins 44 are positioned so as to oppose the upper-die pins 24 projecting from the die 15, respectively. Each of the lower-die pins 44 is formed to have a structure resulting from the upside-down arrangement of the upper-die pin 24. These pins 44 are urged upwardly by springs 30 (as the lower-die urging means of the invention). Additionally, the lower-die pin 44 is provided, at a tip thereof, with a locate pin 44a. The die 35 is provided, at its center, with a vent 36 for exhausting air being present in the cavity.

The insert molding method using the above-constructed molding die 10 and also a primary molded piece will be described below.

Figure 4:
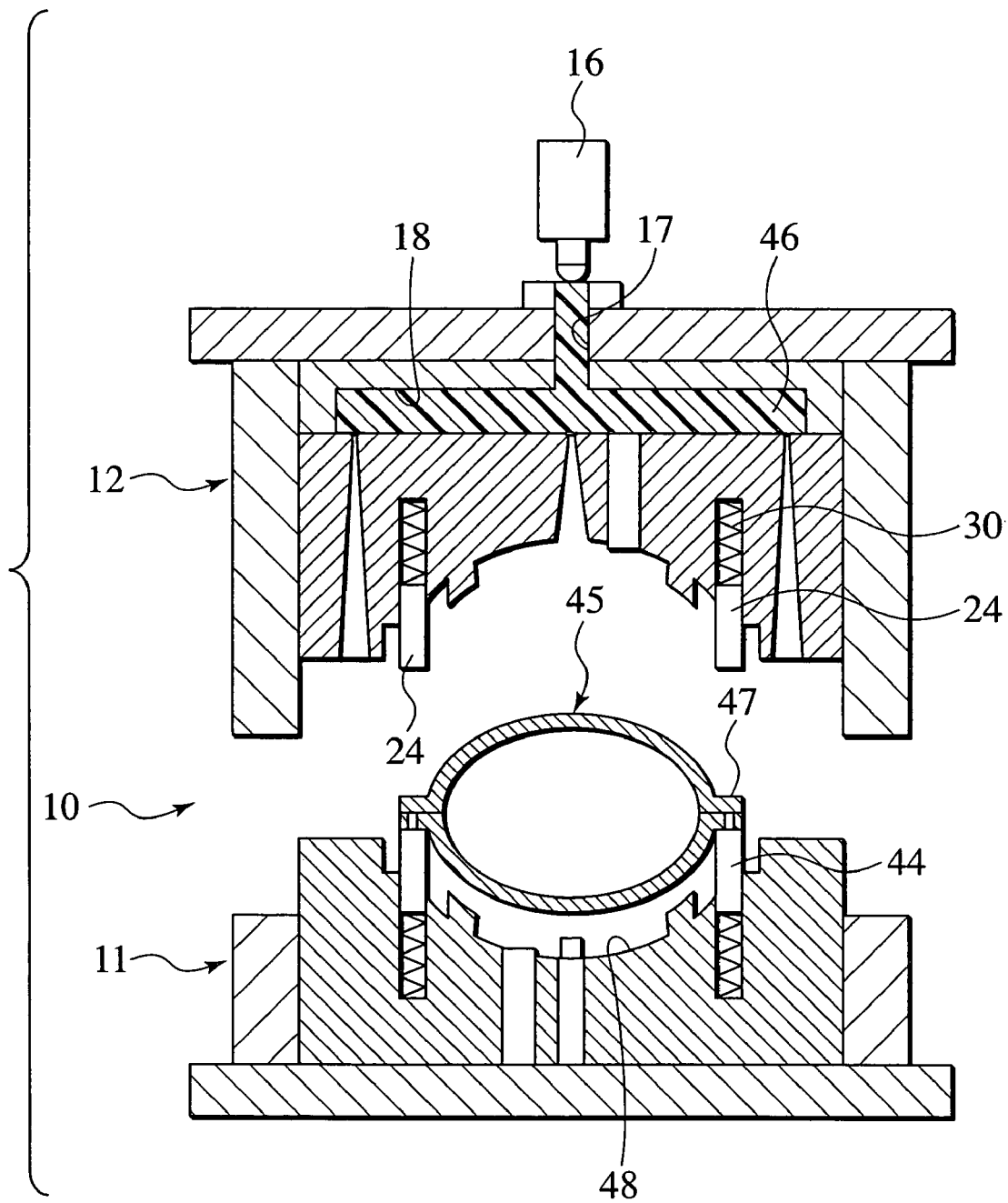
FIG. 4 is a sectional view of a molding die in its opened state, showing a primary molded piece arranged in the molding die.
Figure 5:
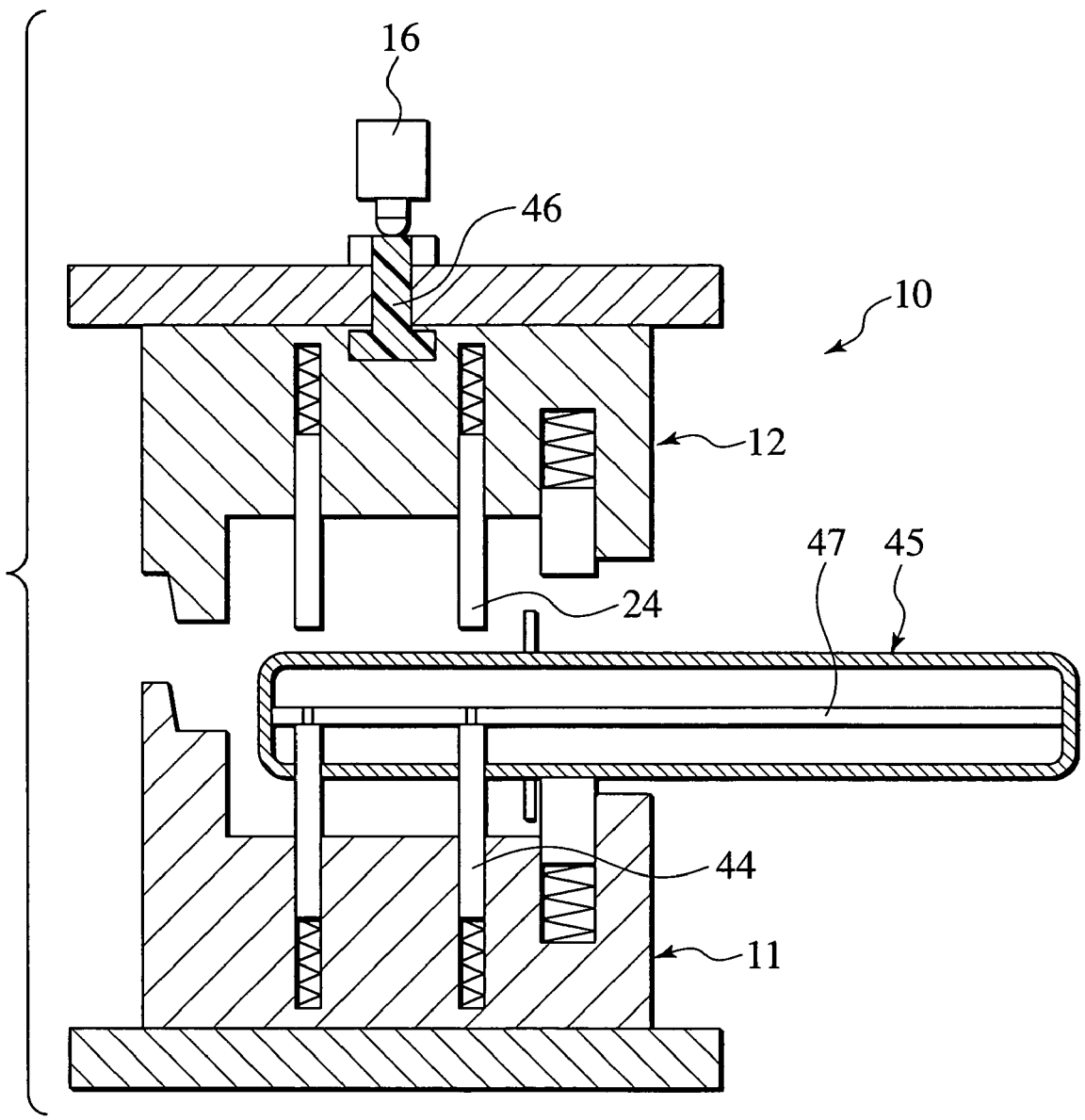
FIG. 5 is another sectional view of the molding die in its opened state, taken in a direction perpendicular to the sectional direction of FIG. 4, showing the primary molded piece arranged in the molding die.

First, as shown in FIGS. 4 and 5, a hollow primary molded piece 45 is arranged on the lower die 11 under condition of opening the molding die 10. Simultaneously, it is started to inject molten resin 46 from the injection cylinder 16. In this embodiment, the primary molded piece 45 is a kind of core member to be used in molding an automotive cross car beam (not shown). The primary molded piece 45 is provided, on both sides along the longitudinal direction, with flanges 47. In advance of molding, the primary molded piece 45 is mounted on the lower-die pins 44 while the flanges 47 are being arranged in position by the locate pins 44a. Consequently, the primary molded piece 45 is lifted up apart from a concave bottom surface 48 forming the cavity of the lower die 11. At the present stage, the molten resin 46 injected from the injection cylinder 16 reaches up to the hot runner 18 through the through hole 17.

Figure 6:
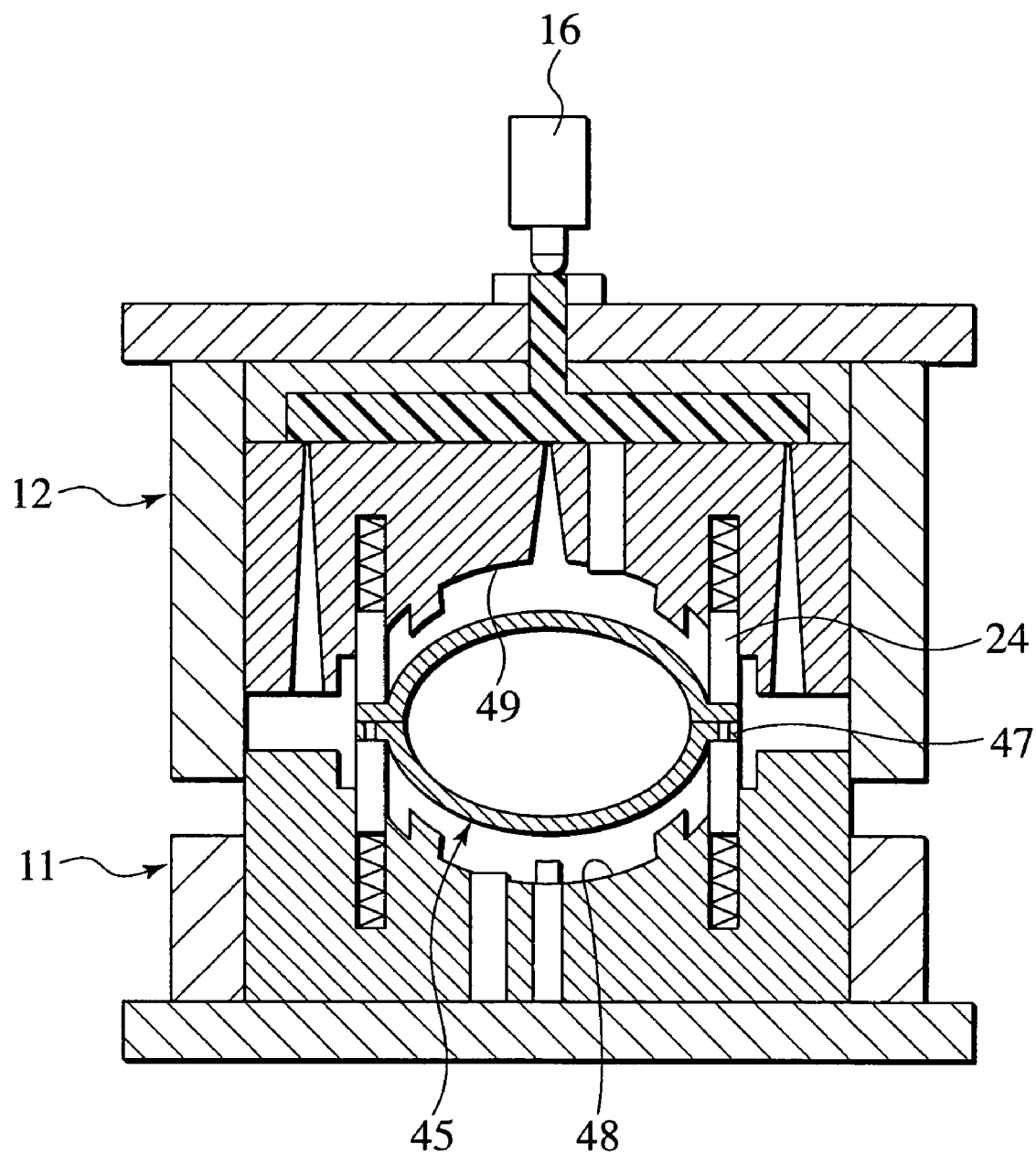
FIG. 6 is a sectional view of the molding die at the beginning of closing process.
Figure 7:
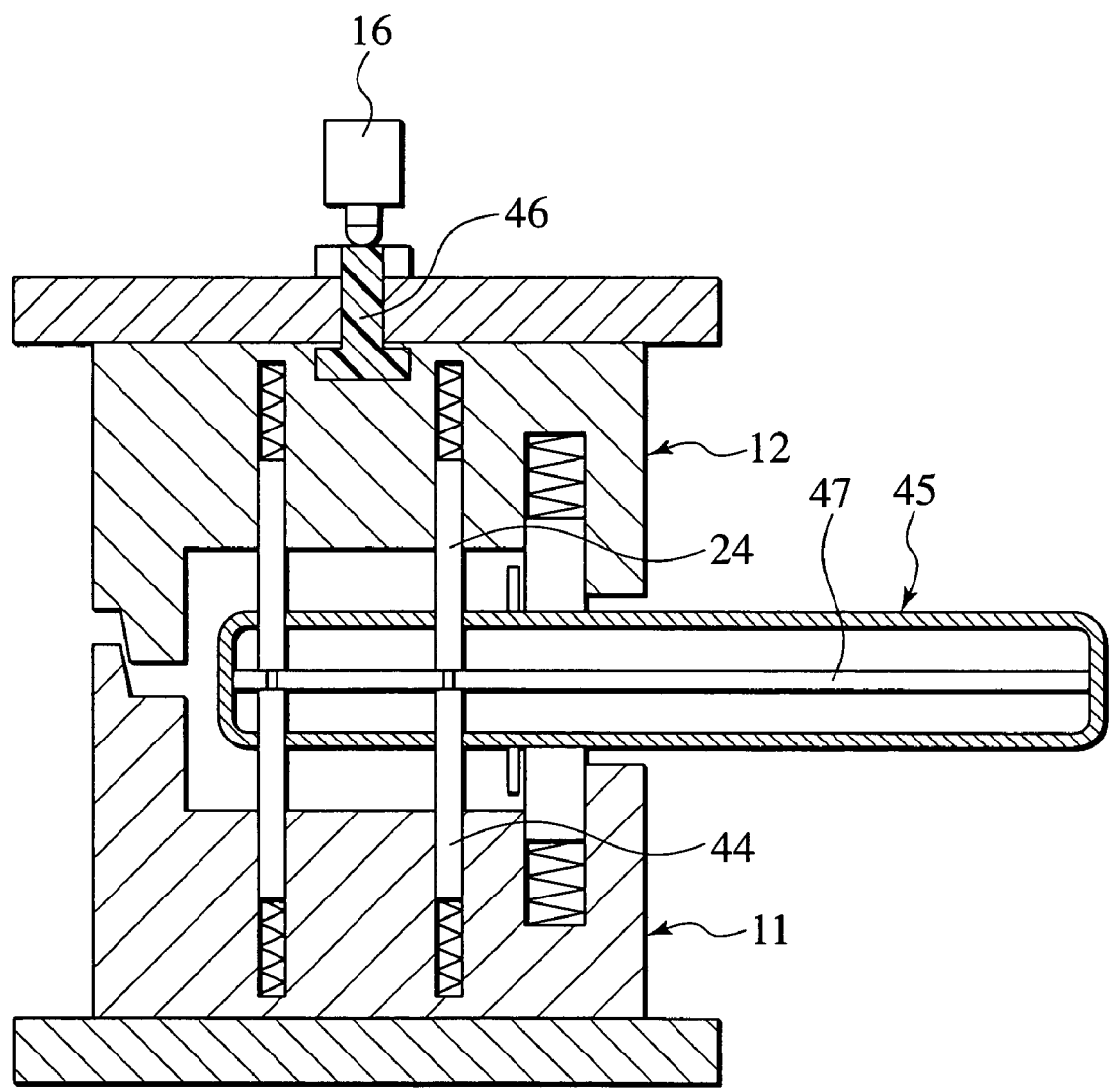
FIG. 7 is another sectional view taken in a direction perpendicular to the sectional direction of FIG. 6, showing the molded die at the beginning of closing process.
Figure 8:
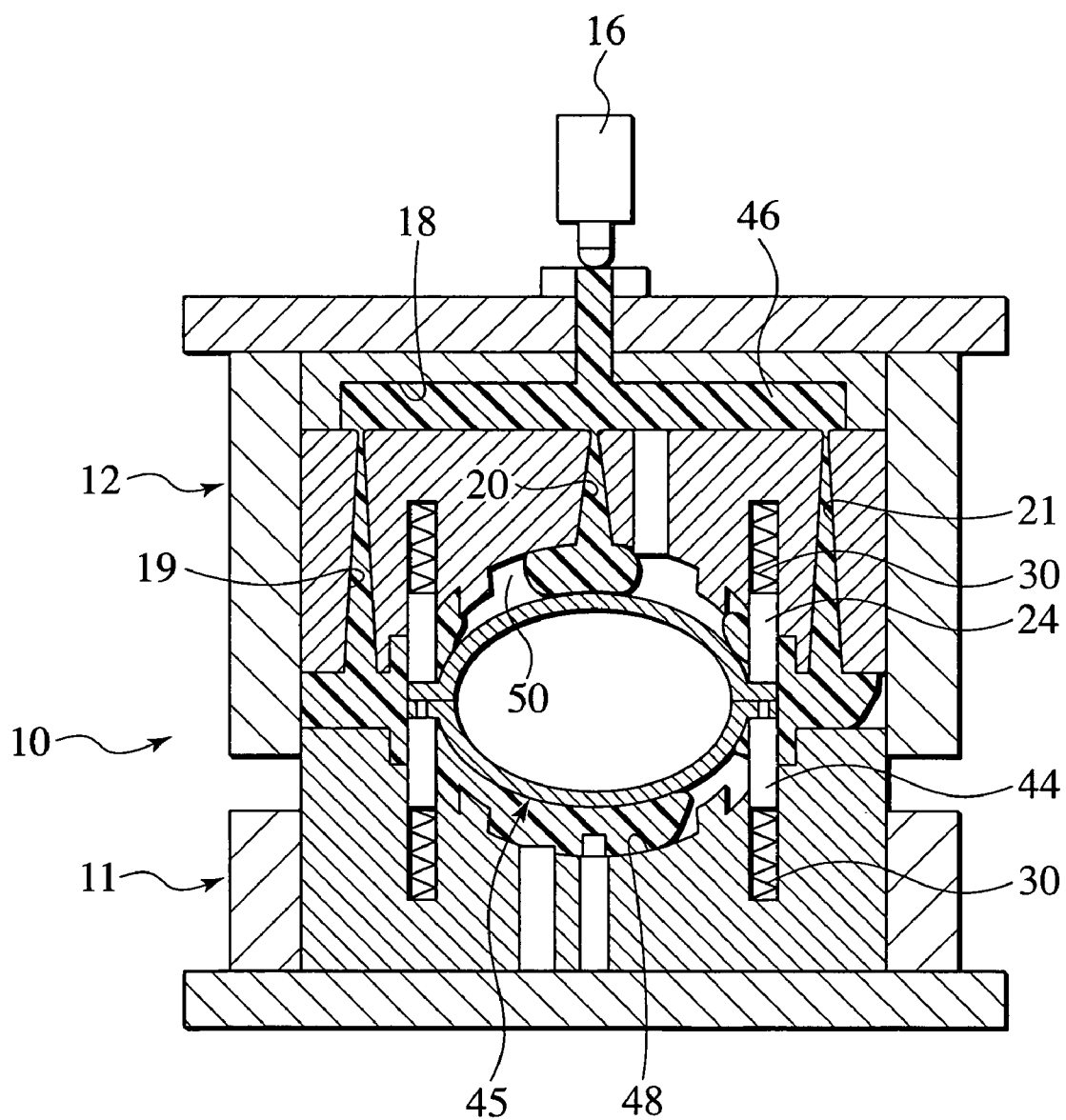
FIG. 8 is a sectional view of a molding die where it is started to inject molten resin into a cavity.
Figure 9:
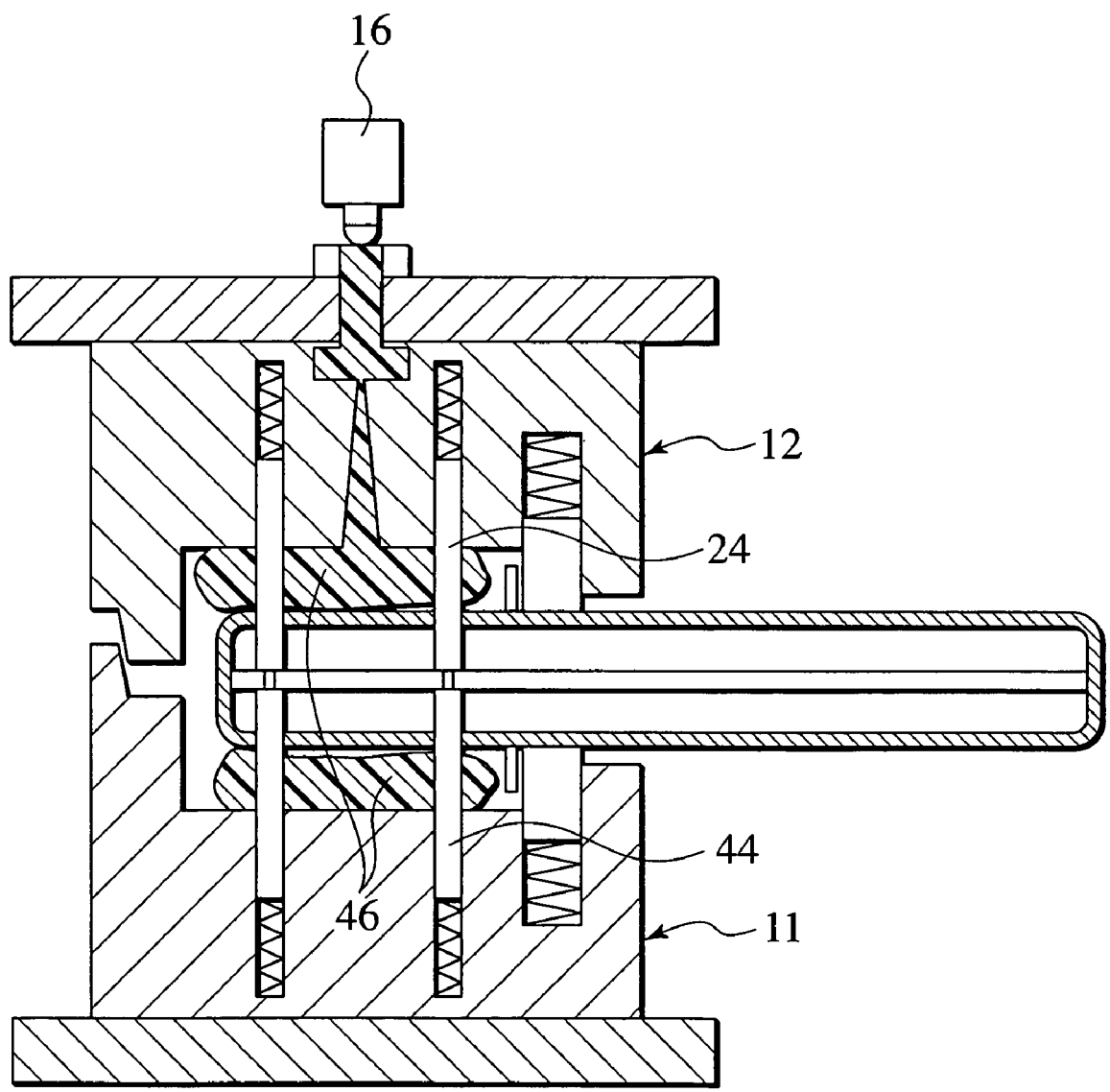
FIG. 9 is another sectional view of the molding die taken in a direction perpendicular to the sectional direction of FIG. 8, showing a state where it is started to inject molten resin into a cavity.

Next, as shown in FIGS. 6 and 7, the upper die 12 is lowered to close the molding die 10. Then, although the upper-die pins 24 of the upper die 12 begin to press the flanges 47 of the primary molded piece 45 downwardly, it is positioned apart from an upper surface 49 of the concave part of the upper die 12 and also the above concave bottom surface 48 of the lower die 11 in predetermined distances respectively (each larger than a thickness of the resin 46 of the product after being molded) From this state, when the molten resin 46 is further injected from the injection cylinder 16 as shown in FIGS. 8 and 9, the molten resin 46 begins to fill up the cavity 50 by way of the hot runner 18 and the gates 19, 20, and 21.

Then, as mentioned before, owing to the formation of a gap between the lower side of the primary molded piece 45 and the concave bottom surface 48 of the lower die 45, it becomes possible to make the molten resin 46 flow up to the underside of the primary molded part 45.

Figure 10:
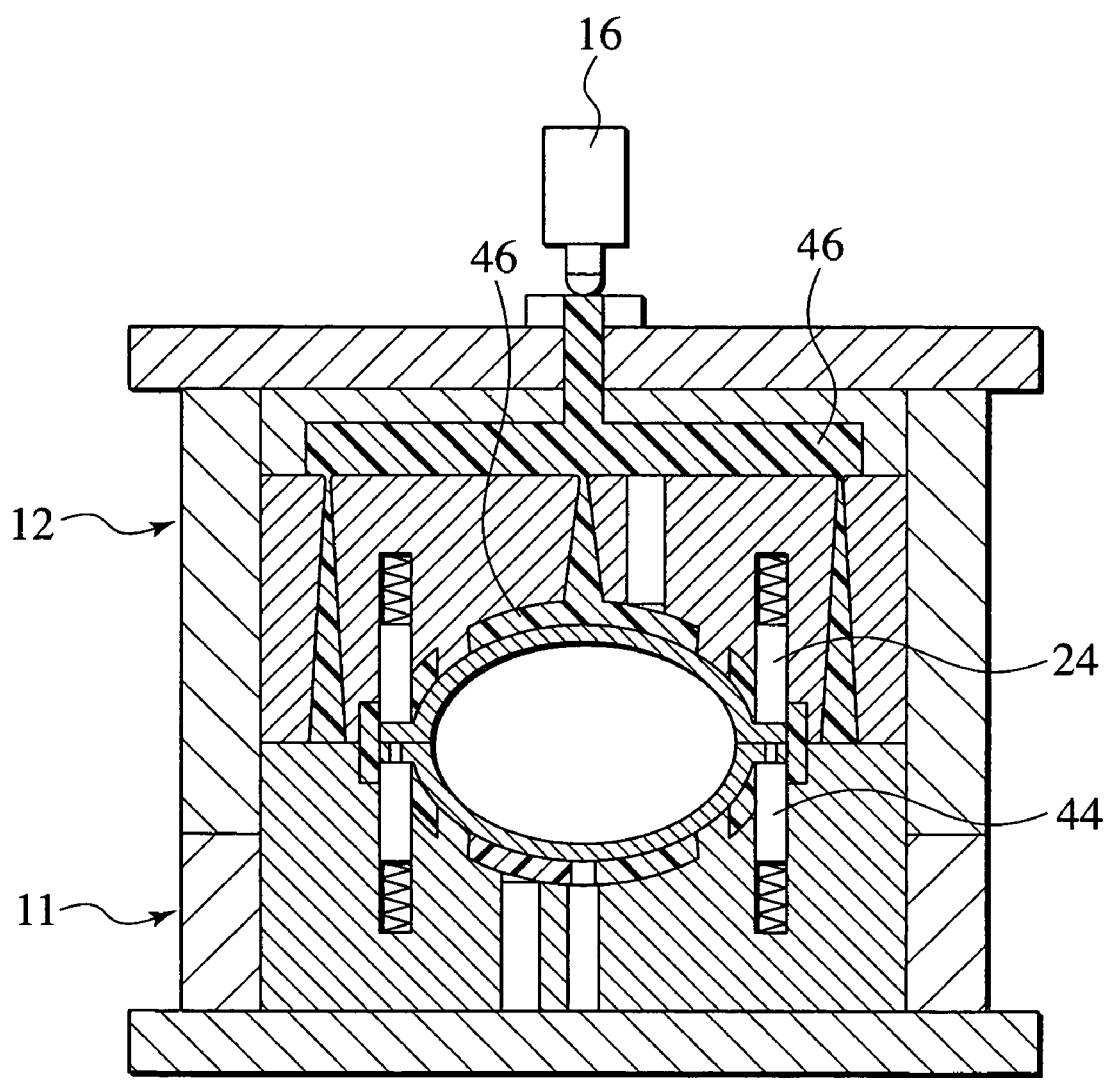
FIG. 10 is a sectional view of the molding die in its completely-closed state.
Figure 11:
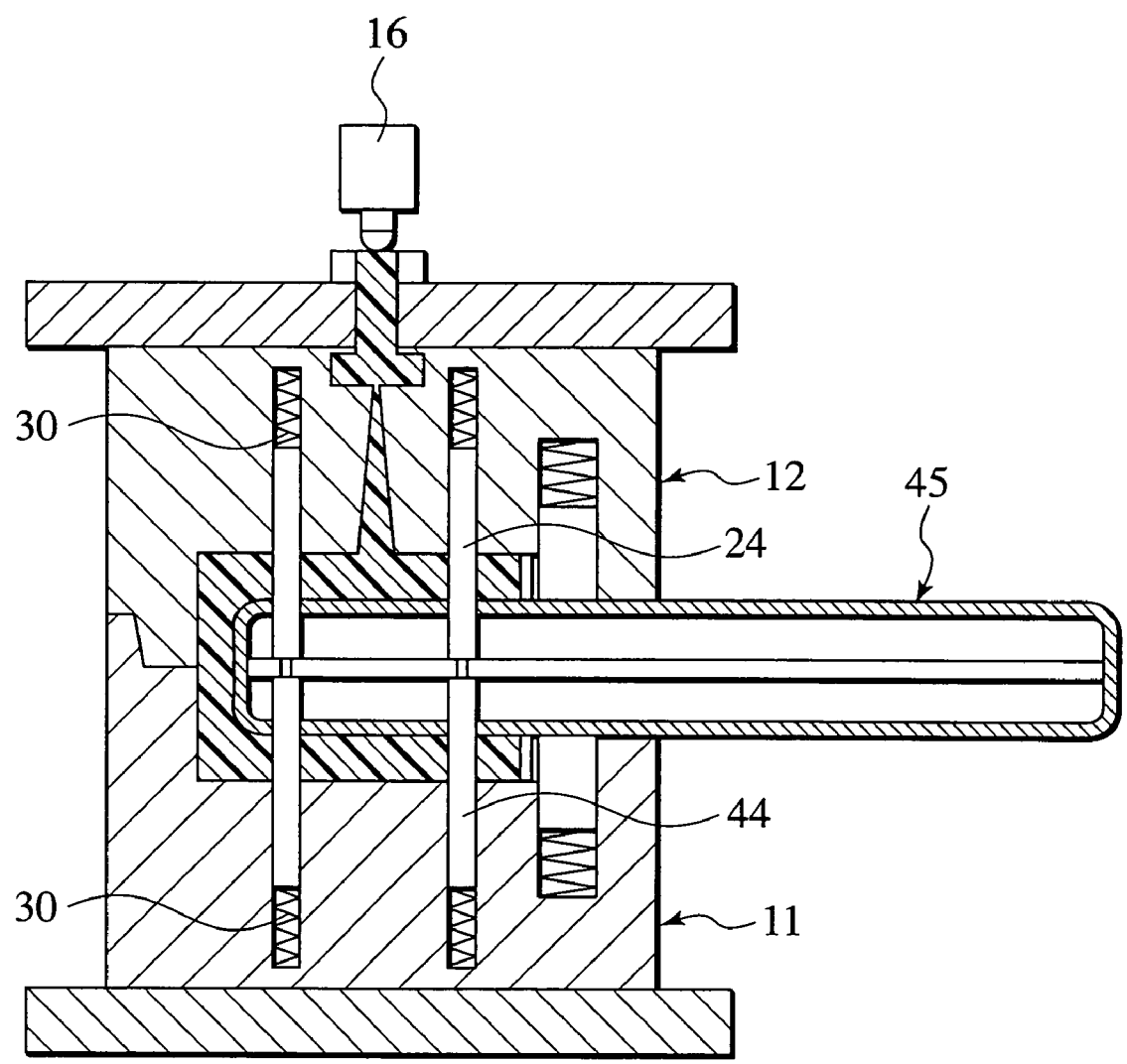
FIG. 11 is another sectional view of the molding die taken in a direction perpendicular to the sectional direction of FIG. 10, showing the molding die in its completely-closed state.

Next, as shown in FIGS. 10 and 11, the molding die 10 is closed up completely to make the upper die 12 and the lower die 11 pressurize the primary molded piece 45 and the molten resin 46 thereabout. In this state, since the underside of the primary molded piece 45 has been already filled up with the molten resin 46, there is no possibility that the primary molded piece 45 is collapsed or deflected in spite of further application of pressure to the piece 45. Additionally, since the molten resin 46 goes around the almost whole area in the cavity 50 of the molding die 10 equally, there is no possibility of occurrence of short shot.

In this way, according to the above-mentioned molding method, since the injection of the molten resin 46 is started in a condition to lift up the primary molded piece 45 from the concave bottom surface 48 of the lower die 11 before completing to close the molding die 10, an injection pressure exerted to the primary molded piece 45 is reduced in comparison with the conventional case where the injection is started after closing the molding die 10 perfectly. Therefore, due to such a reduced injection pressure, it becomes possible to prevent an occurrence of deflection and collapse about the primary molded piece and also the defect of "short shot".

Without being limited to the above-mentioned embodiment, various changes and modifications may be made to the present invention without departing from the spirit and scope of the invention.

Figure 12:
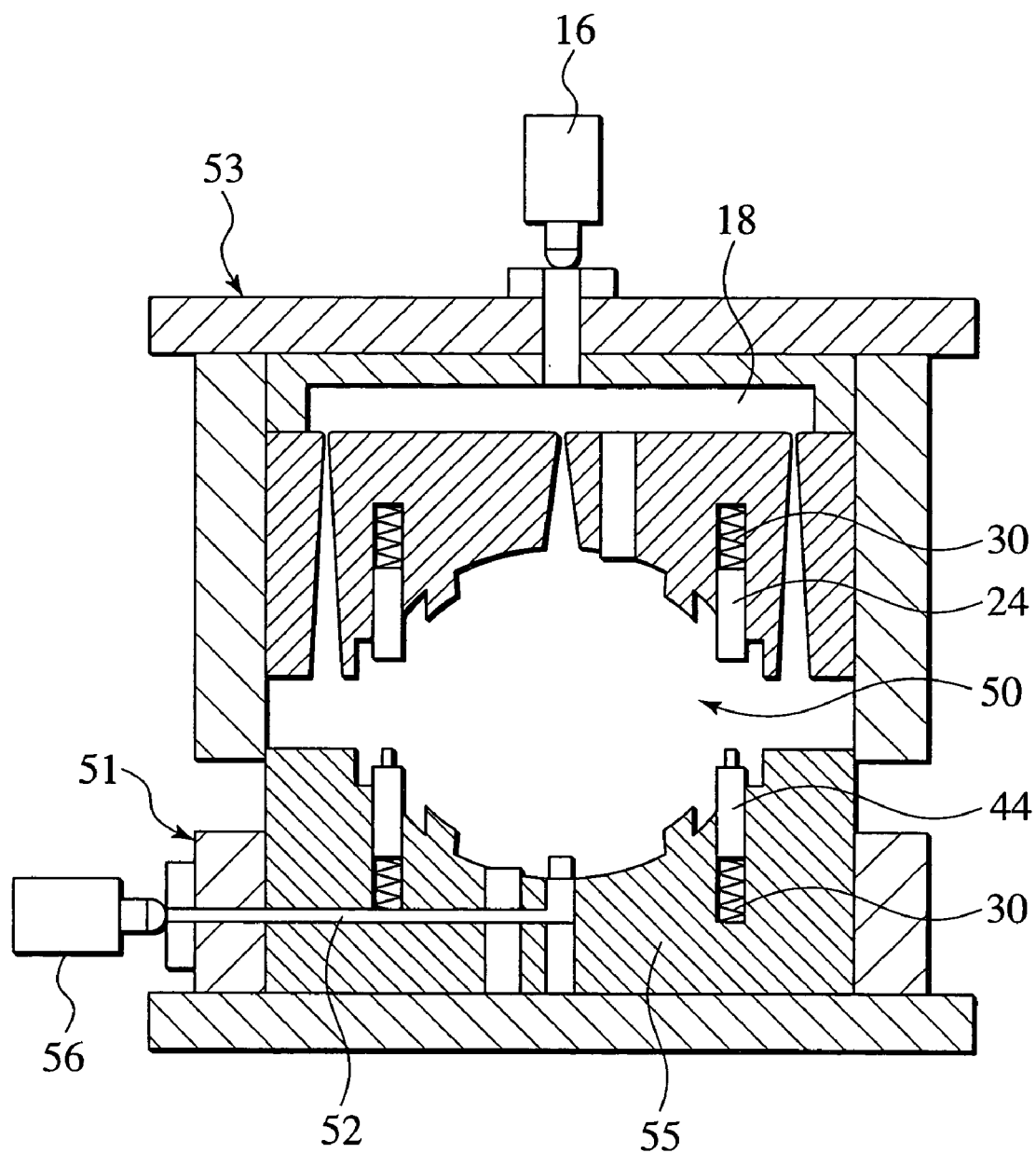
FIG. 12 is a sectional view of the molding die where injection cylinders are arranged in upper and lower dies, respectively.

For example, as shown in FIG. 12, a lower die 51 maybe provided with an injection cylinder 56 and a feed hole 52 penetrating a die 55 and communicating with the cavity. According to this modification, owing to the provision of the injection cylinder 56 for the lower die 51, it is possible to fill up the cavity with the molten resin 46 through both routes of an upper die 53 and the lower die 51. As a result, since the molten resin goes around the underside of the primary molded piece sufficiently, it is possible to avoid an occurrence of defects, such as short shot.

Further, although the upper-die pins 24 and the lower-die pins 44 are urged by the springs 30 in the above-mentioned embodiment, they may be replaced by any ones of pneumatic cylinders, pneumatic dampers and hydraulic cylinders. In case of adopting the pneumatic cylinders or dampers, it is possible to adjust the magnitudes of forces to urge the upper-die pins 24 and the lower-die pins 44 easily. While, in case of adopting the hydraulic cylinders, it is possible to accomplish the fine adjustment of the magnitudes of forces certainly and simply.

Figure 13:
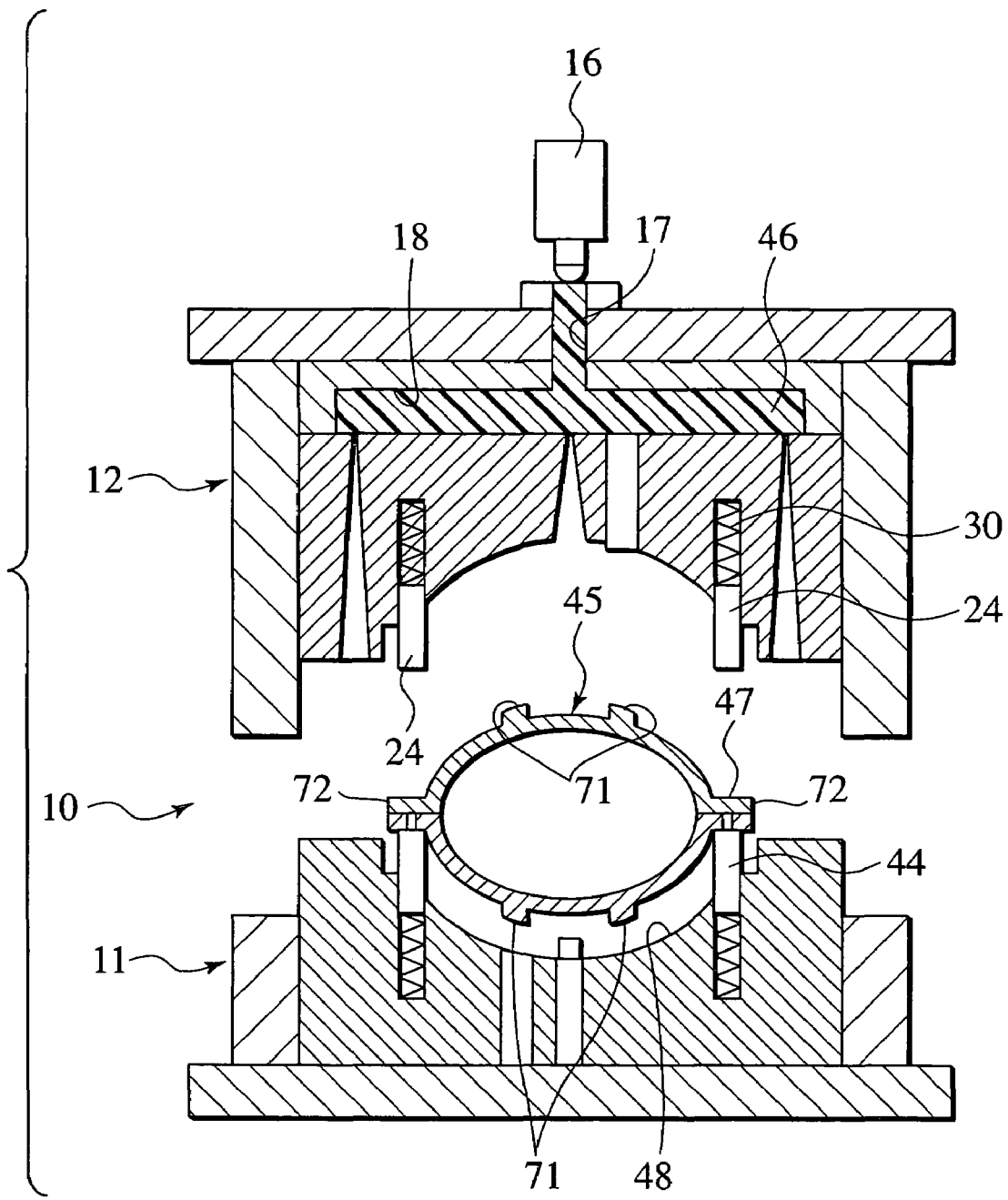
FIG. 13 is a sectional view of a modification of the molding die in its opened state, showing a primary molded piece arranged in the molding die.
Figure 14:
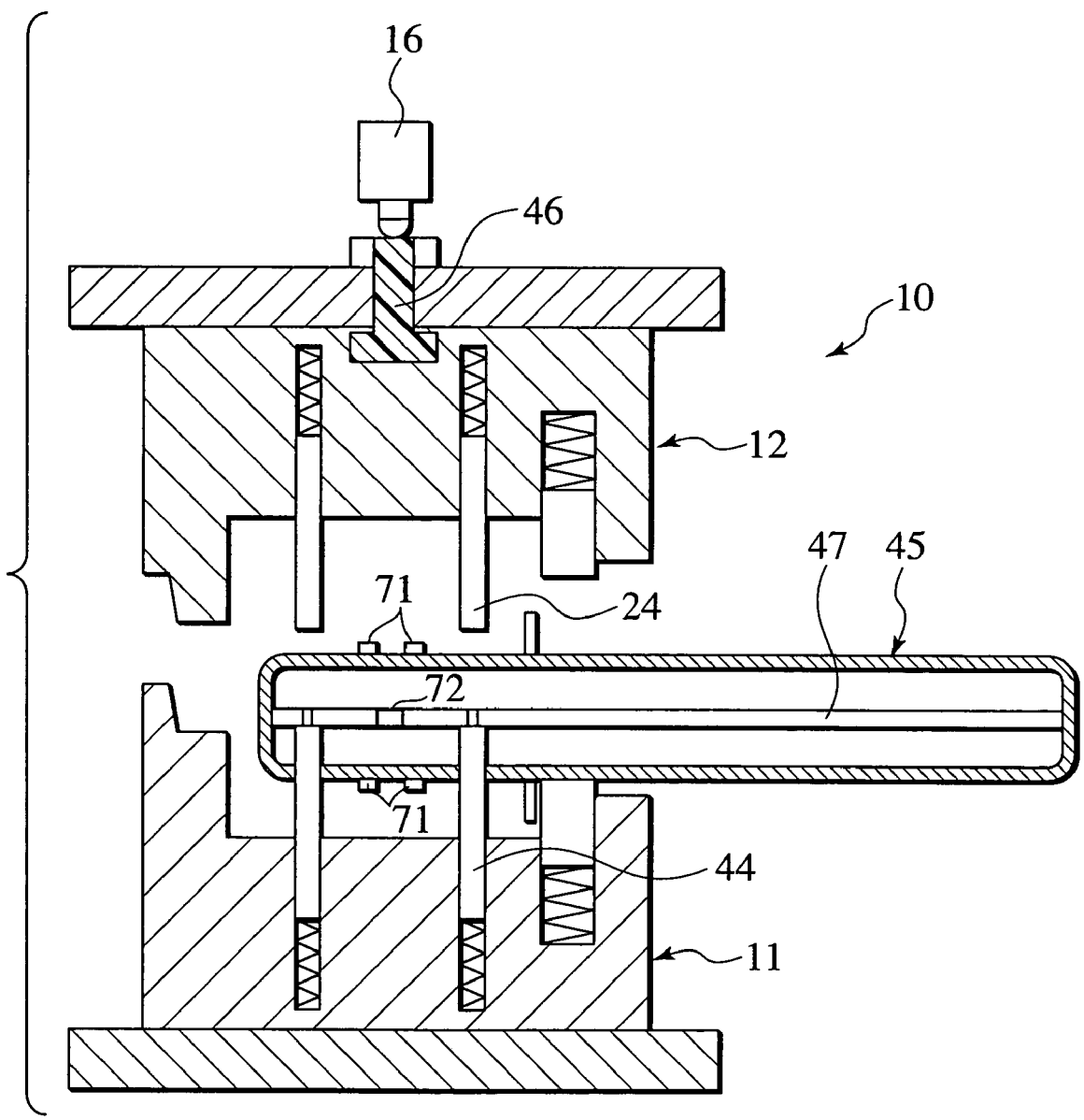
FIG. 14 is another sectional view of the molding die in its opened state, taken in a direction perpendicular to the sectional direction of FIG. 13, showing the primary molded piece arranged in the molding die.

FIGS. 13 and 14 show a modification of the insert molding die which is shown in FIGS. 4 and 5. In this modification, projections 71 and 72 are provided instead of the projections 23 and 43. The projections 71 project from the hollow primary molded piece 45 toward the upper die 12 and the lower die 11 in the vertical direction. The projections 72 project from the hollow primary molded piece 45 in the horizontal direction.

When the lower and upper dies 11 and 12 are closed, the projections 71 abut against the inner surface of the lower and upper dies 11 and 12 to support and retain the hollow primary molded piece 45 on the proper position in the vertical direction during injecting molten resin into the molding die 10. When the lower and upper dies 11 and 12 are closed, the projections 72 abut against the inner side surface of the lower and upper dies 11 and 12 to support and retain the hollow primary molded piece 45 on the proper position in the horizontal direction during injecting molten resin into the molding die 10.

Further, since the hollow primary molded piece 45 carries projections 71 and 72, the rigidity of the hollow primary molded piece 45 is improved, so that the hollow primary molded piece 45 is prevented from being collapsed because of the pressure of the molten resin.

In addition, the present invention may be applied to an injection compression molding or an injection press molding as well as the injection molding.

Additionally, although the above-mentioned embodiment is exemplified by a vertical mold clamping form using the upper die and the lower die, the present invention is not limited to only this clamping form. For instance, the above-mentioned structure of the molding die is applicable to a lateral mold clamping form. That is, needless to say, there is no restriction as for the moving direction of the upper and lower dies.

Finally, it will be understood by those skilled in the art that the foregoing descriptions are nothing but one embodiment of the disclosed insert molding die and an insert molding method using the molding die.

What is claimed is:

1. An insert molding die for a hollow component, comprising:
    an upper die;
    a lower die arranged under the upper die, wherein the upper die and the lower die forms a cavity which accommodates the hollow component and is charged with molten resin;
    a plurality of upper-die pin members disposed on the upper die movably up and down, wherein the upper-die pin members hold the hollow component in the cavity;
    upper-die urging means disposed on the upper die to urge the upper-die pin members downwardly so that the upper-die pin members project from the upper die by opening the upper die and the lower die and the upper-die pin members pressed into the upper die by closing the upper die and the lower die, the upper-die urging means including a first spring for urging a selected upper-die pin member downwardly and a second spring for urging the selected upper-die pin member upwardly, an urging force of the first spring being larger than that of the second spring;
    a plurality of lower-die pin members disposed on the lower die movably up and down so as to oppose the upper-die pin members respectively, wherein the lower-die pin members hold the hollow component in the cavity in cooperation with the upper-die pin members to form a gap between the hollow component and the lower-die; and
    lower-die urging means disposed on the lower die to urge the lower-die pin members upwardly so that the lower-die pin members project from the lower die by opening the upper die and the lower die and the lower-die pin members pressed into the lower die by closing the upper die and the lower die, the lower-die urging means including a third spring for urging a selected lower-die pin member upwardly and a fourth spring for urging the selected lower-die pin member downwardly, an urging force of the third spring being larger than that of the fourth spring.

2. The insert molding die of claim 1, wherein the upper die is provided with injection means adapted to inject molten resin into the cavity.

3. The insert molding die of claim 2, wherein the lower die is provided with another injection means adapted to inject molten resin into the cavity.

4. The insert molding die of claim 1, wherein the selected lower-die pin member is provided with a locate pin for positioning the hollow component in the cavity.

* * * * *